(12) United States Patent
Diakiw et al.

(10) Patent No.: US 9,945,475 B1
(45) Date of Patent: Apr. 17, 2018

(54) DOWNSHIFT SCHEDULING FOR A VEHICLE

(71) Applicant: FORD GLOBAL TECHNOLOGIES, LLC, Dearborn, MI (US)

(72) Inventors: Markian Oleh Diakiw, Livonia, MI (US); Leonidas Kiliaris, Southgate, MI (US); Philip Joseph Wiethe, South Lyon, MI (US); Kurt Howard Nickerson, Shelby Township, MI (US); Brian Michael O'Neil, Ann Arbor, MI (US); Cory Benson LaRoche, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/432,104

(22) Filed: Feb. 14, 2017

(51) Int. Cl.
*F16H 61/02* (2006.01)
*F16H 59/20* (2006.01)
*F16H 59/18* (2006.01)

(52) U.S. Cl.
CPC ......... *F16H 61/0213* (2013.01); *F16H 59/20* (2013.01); *F16H 2059/183* (2013.01); *F16H 2061/0244* (2013.01)

(58) Field of Classification Search
None
See application file for complete search history.

(56) References Cited

U.S. PATENT DOCUMENTS

| 5,941,796 | A | * | 8/1999 | Lee | F16H 61/0437 |
| | | | | | 477/144 |
| 5,961,420 | A | | 10/1999 | Darnell | |
| 6,157,886 | A | * | 12/2000 | Janecke | F16H 61/0213 |
| | | | | | 477/108 |
| 6,554,741 | B2 | | 4/2003 | Saito | |
| 7,247,127 | B2 | | 7/2007 | Popp et al. | |
| 2011/0034298 | A1 | * | 2/2011 | Doering | F02D 41/0002 |
| | | | | | 477/54 |
| 2014/0352669 | A1 | * | 12/2014 | Cunningham | F02D 41/006 |
| | | | | | 123/559.1 |

* cited by examiner

*Primary Examiner* — Justin Holmes
(74) *Attorney, Agent, or Firm* — James Dottavio; Brooks Kushman P.C.

(57) ABSTRACT

A vehicle includes an accelerator pedal moveable across a plurality of predefined positions and a controller programmed to, responsive to the pedal reaching a tip-in position, command a downshift to a downshift gear from an initial gear. A difference between the initial and downshift gears exceeds a number of predefined positions crossed upon moving to the tip-in position when a rate of change of pedal position exceeds a predefined threshold.

22 Claims, 10 Drawing Sheets

| Gears-Remaining Value | Pedal Rate > Rate 1 | Pedal Rate > Rate 2 | Pedal Rate > Rate 3 | Pedal Rate > Rate 4 | Pedal Rate > Rate 5 |
|---|---|---|---|---|---|
| 1 | | | | | |
| 2 | | | | | |
| 3 | | | | | |
| 4 | | | | | |
| 5 | 2 | 2 | 2 | 2 | 3 |
| 6 | | | | | |
| 7 | | | | | |
| 8 | | | | | |
| 9 | | | | | |

10th Gear, 1st Event Line

*FIG. 5A*

| Gears-Remaining Value | Pedal Rate > Rate 1 | Pedal Rate > Rate 2 | Pedal Rate > Rate 3 | Pedal Rate > Rate 4 | Pedal Rate > Rate 5 |
|---|---|---|---|---|---|
| 1 | | | | | |
| 2 | | | | | |
| 3 | 1 | 1 | 1 | 2 | 2 |
| 4 | | | | | |
| 5 | | | | | |
| 6 | | | | | |
| 7 | | | | | |

8th Gear, 2nd Event Line

*FIG. 5B*

| Gears-Remaining Value | Pedal Rate > Rate 1 | Pedal Rate > Rate 2 | Pedal Rate > Rate 3 | Pedal Rate > Rate 4 | Pedal Rate > Rate 5 |
|---|---|---|---|---|---|
| 1 | 1 | 1 | 1 | 1 | 1 |
| 2 | | | | | |
| 3 | | | | | |
| 4 | | | | | |
| 5 | | | | | |

6th Gear, 3rd Event Line

*FIG. 5C*

| Gears-Remaining Value | Pedal Rate > Rate 1 | Pedal Rate > Rate 2 | Pedal Rate > Rate 3 | Pedal Rate > Rate 4 | Pedal Rate > Rate 5 |
|---|---|---|---|---|---|
| 1 | | | | | |
| 2 | | | | | |
| 3 | | | | | |
| 4 | | | | | |
| 5 | | | | | |
| 6 | 2 | 2 | 3 | 4 | 5 |
| 7 | | | | | |
| 8 | | | | | |
| 9 | | | | | |

10th Gear, 3rd Event Line

DOWNSHIFT SCHEDULING FOR A VEHICLE

TECHNICAL FIELD

The present disclosure relates to downshift scheduling for an automatic transmission of a vehicle.

BACKGROUND

Downshift scheduling for automatic transmissions may be based on gear and pedal position. A downshift scheduling plot may illustrate a relationship between vehicle speed and a driver demand for torque, the latter being indicated by an accelerator pedal position. If the pedal spacing between shift points on the plot are too close together, a driver may tip-in and back out of the pedal to hunt for the desired gear to meet driver demand.

SUMMARY

According to one embodiment, a vehicle includes an accelerator pedal moveable across a plurality of predefined positions and a controller programmed to, responsive to the pedal reaching a tip-in position, command a downshift to a downshift gear from an initial gear. A difference between the initial and downshift gears exceeds a number of predefined positions crossed upon moving to the tip-in position when a rate of change of pedal position exceeds a predefined threshold.

According to another embodiment, a vehicle includes an accelerator pedal moveable across a plurality of predefined positions and a controller. The controller is programmed to, responsive to the pedal crossing a predefined position, set a downshift gear based on a last position line crossed. The controller is further programmed to, responsive to the pedal reaching a tip-in position, command a downshift to the downshift gear from an initial gear. A difference between the initial and downshift gears exceeds a number of predefined positions crossed upon reaching the tip-in position.

According to another embodiment, a vehicle includes an accelerator pedal moveable across a plurality of predefined positions and a controller. The controller is programmed to, responsive to the pedal crossing at least one predefined position at a given speed upon reaching a tip-in position, command a downshift to a downshift gear from an initial gear. The downshift gear is based on a rate of change of pedal position, a last predefined position crossed upon reaching the tip-in position, and a gears-remaining value indicative of a number of gears able to support the given speed. A difference between the downshift and initial gears is greater than a number of predefined positions crossed upon reaching the tip-in position.

According to another embodiment, a method for downshifting a transmission includes responsive to a computed torque demand increasing through at least one predefined torque threshold in a plurality of predefined torque thresholds and a rate of change of the torque demand exceeding a predefined rate threshold, command a downshift to a downshift gear from an initial gear upon expiration of a predefined amount of time. The downshift gear is based on a highest of the torque thresholds through which the demand increased, and a difference between the gears exceeds a number of predefined torque thresholds crossed.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
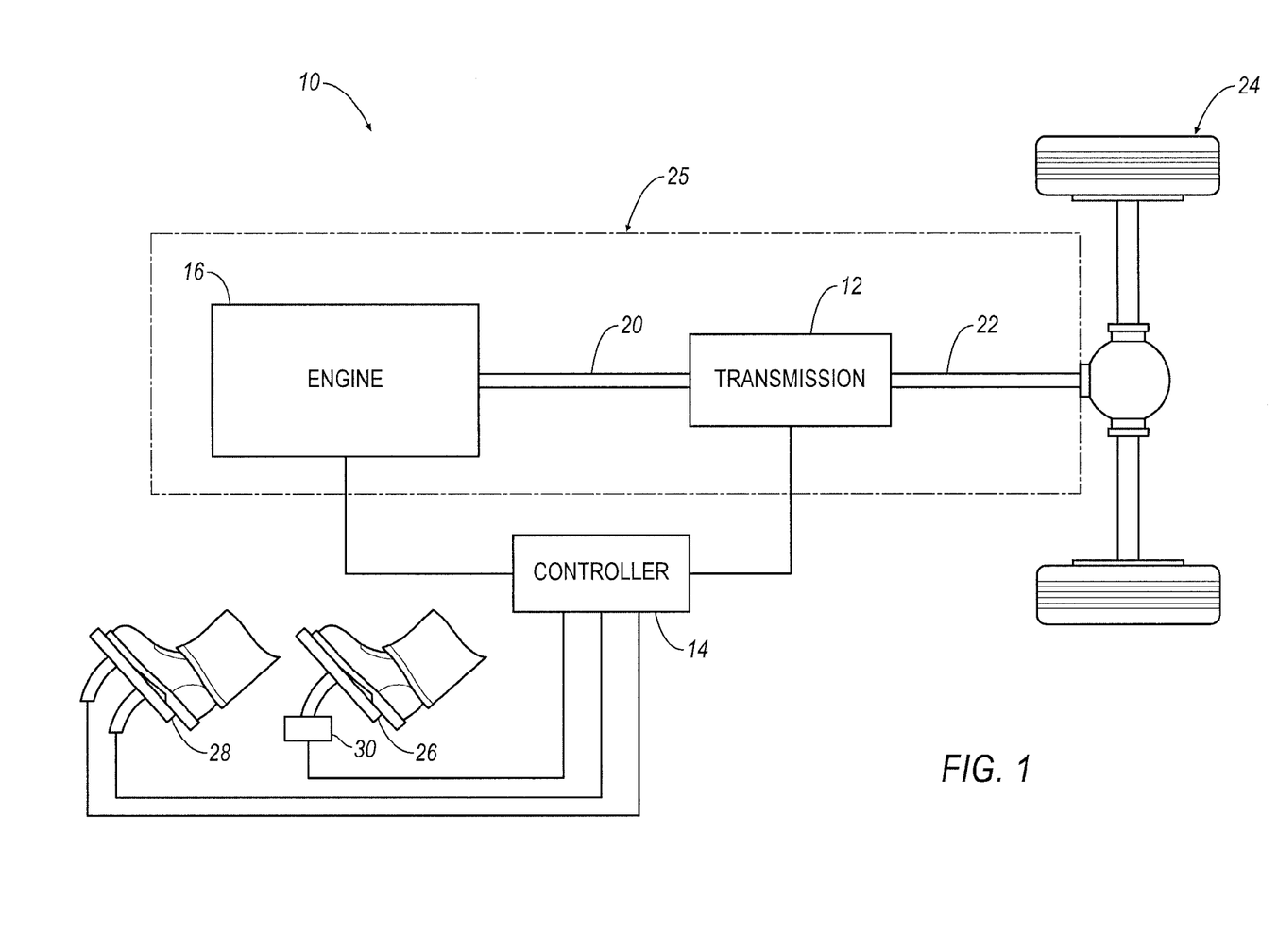
FIG. 1 is a schematic representation of a vehicle with an automatic transmission.

FIG. 1 is a schematic representation of a vehicle 10 with an automatic transmission 12. Vehicle 10 may further include a controller 14 connected to an engine 16 and transmission 12. While illustrated as one controller, controller 14 may be part of a larger control system and may be controlled by various other controllers throughout the vehicle 10, such as a vehicle system controller (VSC). It should therefore be understood that controller 14 and one or more other controllers can collectively be referred to as a "controller" that controls various actuators in response to signals from various sensors to control functions of vehicle 10 or vehicle subsystems. Controller 14 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by controller 14 in controlling vehicle 10 or vehicle subsystems.

Control logic or functions performed by controller 14 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 14. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Controller 14 may be configured to receive various states or conditions of various vehicle components via electrical signals. The electrical signals may be delivered to controller 14 from the various components via input channels. Additionally, the electrical signals received from the various components may be indicative of a request or a command to change or alter a state of one or more of the respective components of vehicle 10. Controller 14 includes output channels that are configured to deliver requests or commands (via electrical signals) to the various vehicle components. Controller 14 includes control logic and/or algorithms that are configured to generate the requests or commands delivered through the output channels based on the requests, commands, conditions, or states of the various vehicle components.

The input channels and output channels are illustrated as lines in FIG. 1. It should be understood that a single line may be representative of both an input channel and an output channel into or out of a single element. Furthermore, an output channel into one element may operate as an input channel to another element and vice versa.

Still referring to FIG. 1, vehicle 10 may further include a transmission input shaft 20 connecting engine 16 to transmission 18 and a transmission output shaft 22 connecting transmission 18 to wheels 24 of vehicle 10. Collectively, engine 16, transmission 18, and shafts 20, 22, may make up a powertrain 25 of vehicle 10. Vehicle 10 may also include an accelerator pedal 26 and a brake pedal 28 operated by a driver to selectively increase and decrease a speed of vehicle 10. Accelerator pedal 26 may include an accelerator pedal sensor 30 connected to controller 14.

Figure 2:
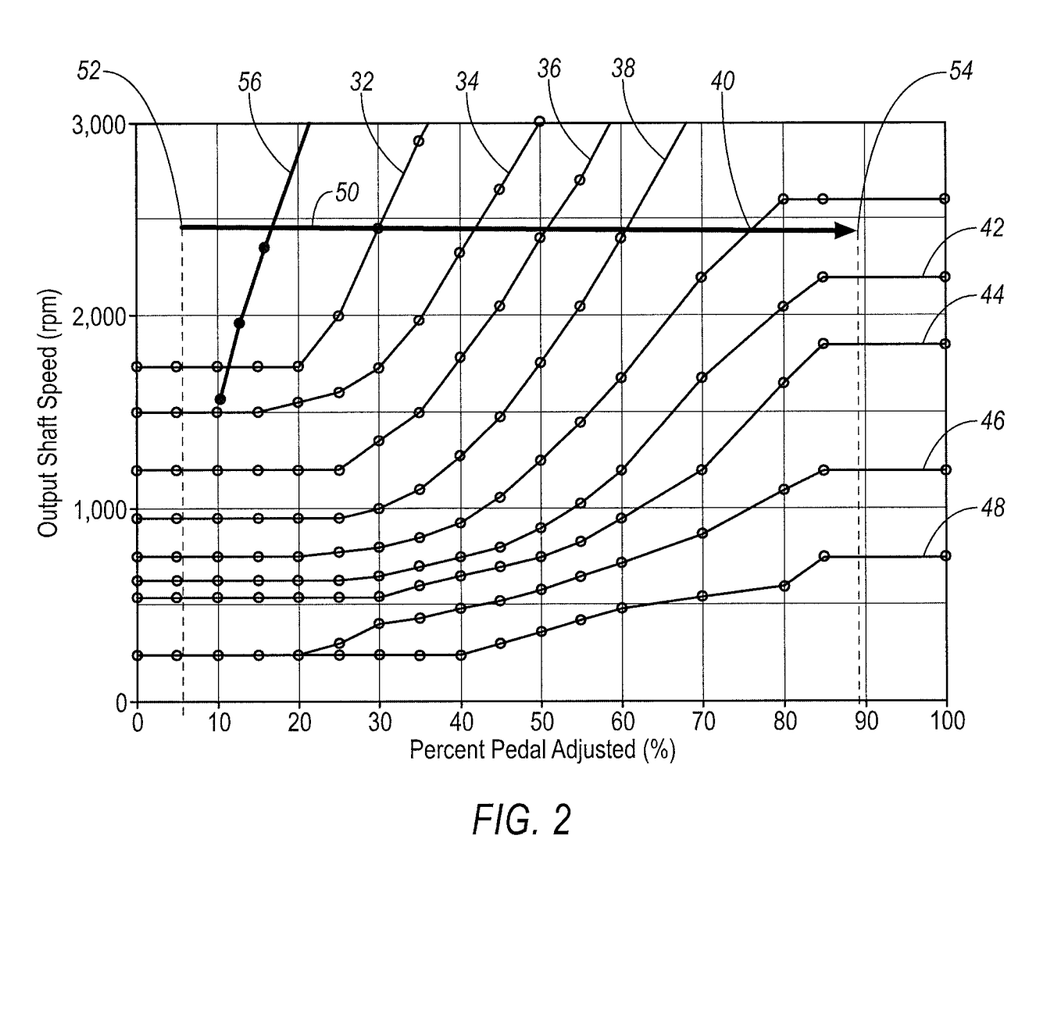
FIG. 2 is a downshift scheduling plot that may be implemented by a controller of the vehicle of FIG. 1 to control downshifts in accordance with one embodiment of the present disclosure.

FIG. 2 is a downshift scheduling plot that may be implemented by controller 14 of vehicle 10 of FIG. 1 to control downshifts in accordance with one embodiment of the present disclosure. As the driver depresses accelerator pedal 26 indicative of a desired acceleration, the position of pedal 26 may exceed one or more than one predefined position(s) at a given speed of output shaft 22 (shaft 22 shown in FIG. 1) such that exceeding the predefined position(s) results in a downshift to a downshift gear. The plot of FIG. 2 illustrates the predefined positions as downshift curves 32, 34, 36, 38, 40, 42, 44, 46, 48 with each curve representing a downshift by one gear. The plot of FIG. 2 may be applicable to a ten-speed transmission (i.e., ten gears). For example, downshift curve 32 may represent a downshift from tenth gear to ninth gear, downshift curve 34 may represent a downshift from ninth gear to eighth gear, downshift curve 36 may represent a downshift from eighth gear to seventh gear, and so on. An input curve 50 is an example of a tip-in event where the driver depresses the pedal 26 from a position 52 to a tip-in position 54 at a given shaft speed of approximately 2400 rpm. As shown, as pedal 26 is depressed from position 52 to tip-in position 54, downshift curves 32, 34, 36, 38, 40 are crossed. As such, controller 14 may command a downshift from tenth gear to fifth gear due to the crossing of five downshift curves. A road-load curve 56 may associate a pedal position (x-axis) for maintaining a given speed of vehicle 10 (e.g., of output shaft 22) (y-axis). For example and without limitation, the pedal position to maintain a speed of 2500 rpm may be approximately 17%. The curvature and shapes of the lines and curves illustrated in the plot are merely exemplary; the lines and curves may take on a variety of shapes and characteristics in accordance with other embodiments of the instant disclosure. Because each curve in FIG. 2 represents a downshift by only one gear, there are nine curves for a ten-speed transmission. To include nine curves on the downshift scheduling plot, the pedal spacing between adjacent downshift curves may be relatively small. As such, the driver may have to tip-in and back out of the pedal to hunt for the appropriate gear to meet driver demand for acceleration.

Figure 3:
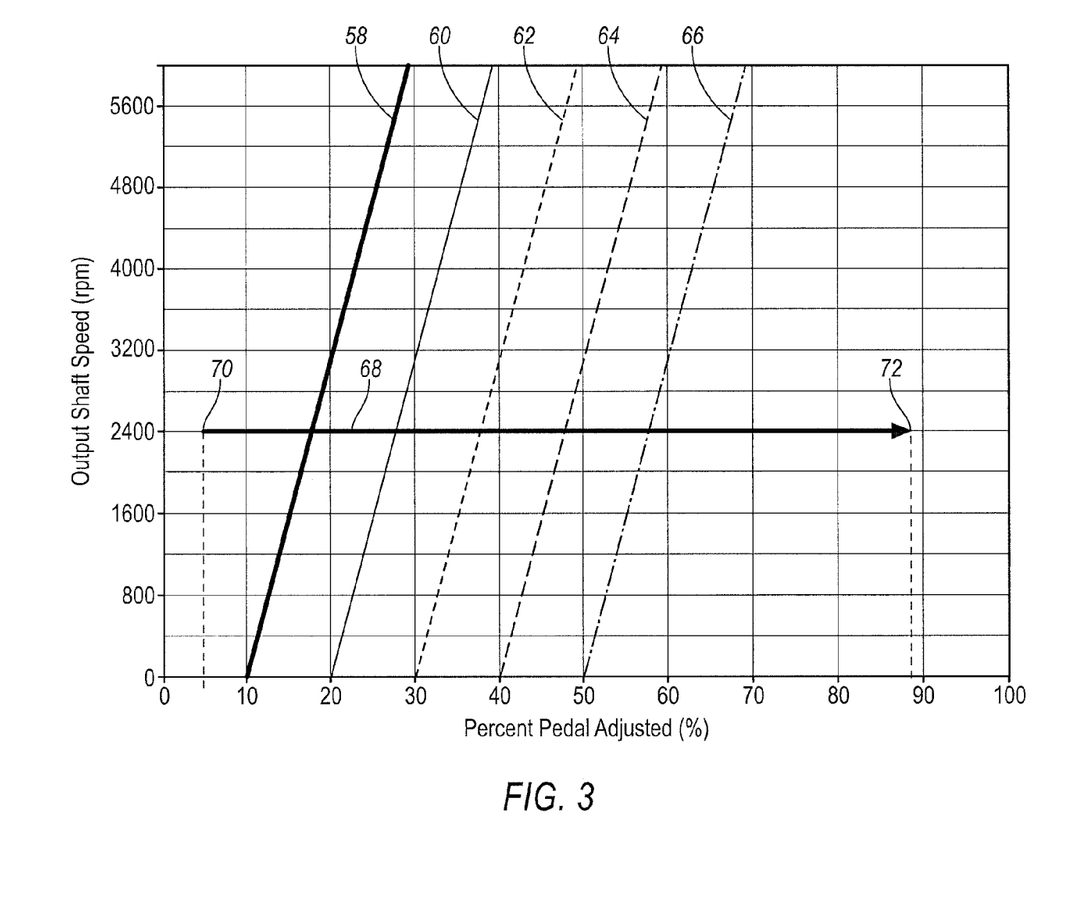
FIG. 3 is another downshift scheduling plot that may be implemented by the controller of the vehicle of FIG. 1 to control downshifts in accordance with another embodiment of the present disclosure.

FIG. 3 is another downshift scheduling plot that may be implemented by controller 14 of vehicle 10 of FIG. 1 to control downshifts in accordance with another embodiment of the present disclosure. The plot of FIG. 3 may be used for a ten-speed transmission as well. A road-load curve 58 may associate a pedal position for maintaining a speed of vehicle 10 (e.g., of output shaft 22). As the driver depresses accelerator pedal 26 indicative of a desired acceleration, the position of pedal 26 may exceed one or more than predefined position(s) at a given speed of output shaft 22 such that exceeding the predefined position(s) results in a downshift to a downshift gear. The plot of FIG. 3 illustrates the predefined positions as event lines 60, 62, 64, 66 with each line representing a downshift by zero, one, or more than one gear. An input curve 68 is an example of a tip-in event where the driver depresses the pedal 26 from a position 70 to a tip-in position 72 at an output shaft speed of approximately 2400 rpm. As shown, as pedal 26 is depressed from position 70 to tip-in position 72, event lines 60, 62, 64, 66 are crossed. Although only four event lines are crossed, controller 14 may command a downshift of less or more than four gears, as will be explained in more detail below. For example and without limitation, the plot of FIG. 3 may be referred to as a "tip-in" downshift schedule. Depending on certain criteria, controller 14 may carry out a downshift according to the downshift scheduling plot of FIG. 2 or of the "tip-in" downshift scheduling plot of FIG. 3. The curvature and shapes of the lines and curves illustrated in the plot are merely exemplary; the lines and curves may take on a variety of shapes and characteristics in accordance with other embodiments of the instant disclosure. Furthermore, the nomenclature chosen to identify the curves and lines in the plots are not intended to limit the shape of the respective curve or line; i.e., "curves" identified in the plot may be linear, and "lines" identified in the plot may be curved or non-linear in accordance with the instant disclosure. In addition, although the speed of output shaft 22 is used as indicating the speed of the vehicle 10, the speed of other vehicle components may be utilized.

Figure 4:
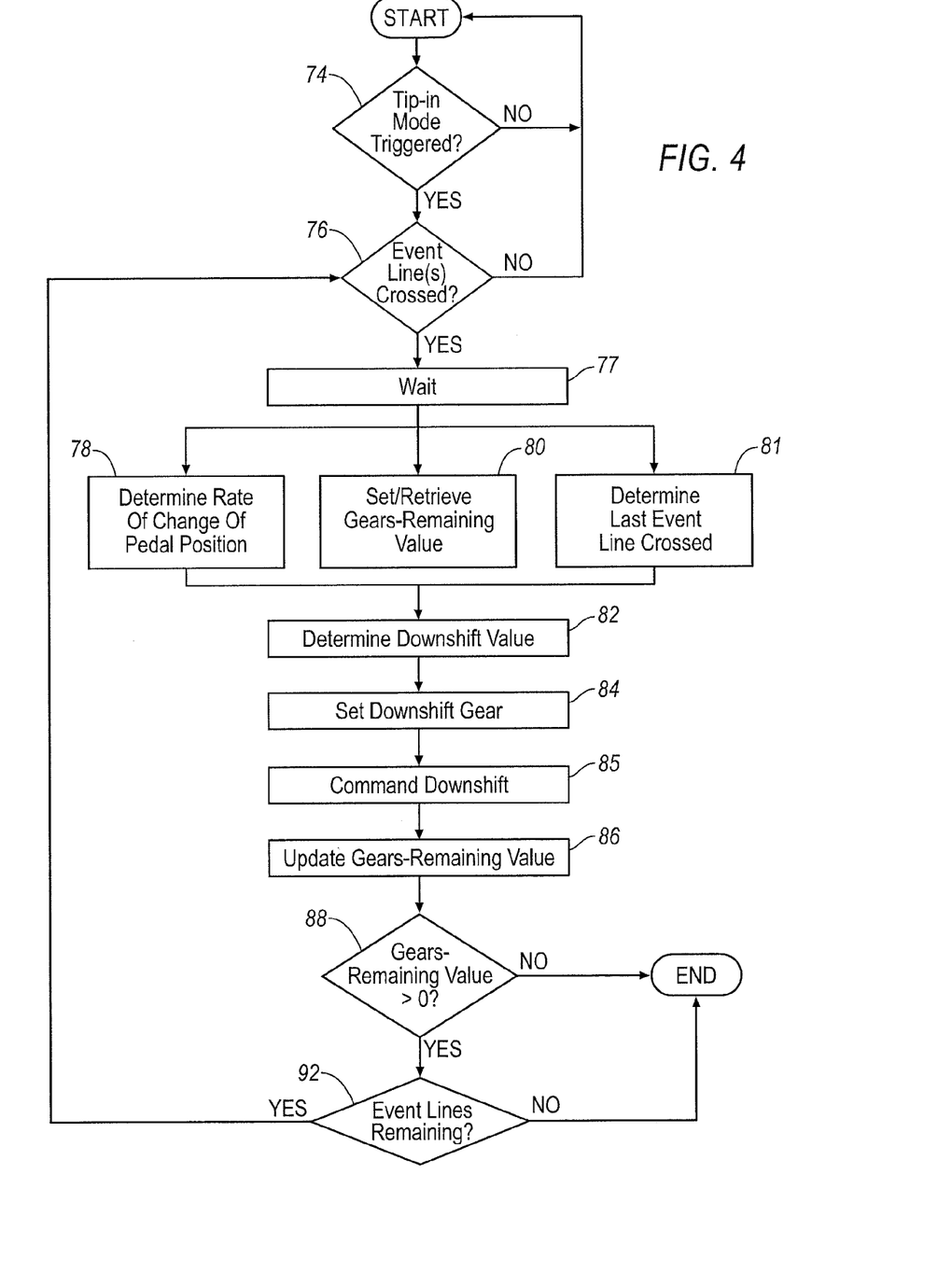
FIG. 4 illustrates a flowchart representing an algorithm in accordance with the downshift scheduling plot of FIG. 3.

FIG. 4 illustrates a flowchart representing an algorithm in accordance with the downshift scheduling plot of FIG. 3. The method may begin with the step 74 of determining whether tip-in mode is triggered. Tip-in mode may be associated with the tip-in downshift scheduling plot of FIG. 3. The algorithm illustrated in FIG. 4 may be used to determine a downshift gear to which controller 14 may command a downshift to meet driver demand for increased acceleration. In one embodiment, tip-in mode is triggered when (1) a rate of change of position of accelerator pedal 26 exceeds a calibratable rate threshold that is a function of the current gear and of the active shift schedule, (2) a position of the pedal is greater than a calibratable position threshold that is a function of a speed of vehicle 10 (e.g., of output shaft 22) and of the active shift schedule, and (3) there is at least one downshift gear available (i.e., current gear is above first gear and there is a lower gear available that can support the current speed). With respect to (1), if the active shift schedule is the downshift scheduling plot illustrated in FIG. 2 and the current gear is tenth gear, the calibratable rate threshold may be low such that even a relatively low rate of change of accelerator pedal position may trigger tip-in mode. As yet another example (and without limitation), if the active shift schedule is a tow-haul mode, the calibratable rate threshold may be relatively high such that tip-in mode may only be triggered for relatively quick pedal stabs. In such a case, the downshift scheduling plot of FIG. 2 may be desirable to provide single step downshifts such that vehicles pulling a trailer, for example, may experience gradual torque increases without sudden acceleration changes. With respect to (2), the calibratable position threshold for triggering tip-in mode may be the predefined position associated with the first event line (event line 60 in the illustrated example) for a given speed. In such an embodiment, tip-in mode may not be triggered before the pedal crosses the first event line (even with a high rate of change of pedal position). With reference to FIG. 3, although input curve 68 is an example of tip-in mode being triggered upon crossing of event line 60, tip-in mode may be triggered subsequent (or prior) to crossing of event line 60. If at step 74, tip-in mode is not triggered, controller 14 may continue to operate under the active shift schedule until conditions associated with a different shift schedule are met.

If at step 74, tip-in mode is triggered, the method may continue with the step 76 of determining whether an event line 60, 62, 64, 66 has been crossed. Controller 14 may be programmed to determine whether a position of accelerator pedal 26 exceeds a predefined position associated with an event line at a given speed (of output shaft 22, for example). In the illustrated embodiment as shown in FIG. 3, the predefined position associated with event line 60 is approximately 28% pedal adjusted for a given speed of 2400 rpm. "Percent pedal adjusted" may be defined as the percentage of pedal depression from the neutral (undepressed) position (i.e., 0% pedal adjusted may be the neutral position, and 100% pedal adjusted may be the fully depressed or wide-open-throttle position). In one embodiment, the predefined position threshold associated with event line 60 may also be the calibratable position threshold for triggering tip-in mode (discussed above with respect to step 74). If at step 76, controller 14 determines that an event line has not been crossed (for example, after a predefined amount of time), controller 14 either continues operating under tip-in mode or will operate under a different shift schedule (assuming conditions for the different shift schedule are met at that time).

If at step 76, controller 14 determines that an event line has been crossed, the method may continue with the step 77 of waiting a predefined amount of time to determine whether the pedal 26 crosses additional event lines 60, 62, 64, and/or 66 (i.e., additional predefined positions at a given speed). In one embodiment, the predefined amount of time may be 30-100 milliseconds. For a quick pedal stab, the pedal 26 may cross multiple event lines within the predefined amount of time.

After waiting the predefined amount of time, the method may continue with the step 78 of determining a rate of change of position of accelerator pedal 26. The rate may be continuously calculated and filtered with a simple time constant. For example and without limitation, the rate may be calculated using a double rolling average calculation where a filter constant (e.g., a percentage) is applied to the change of pedal rate (from previous loop to current loop) and added to the previously calculated pedal rate. Those of ordinary skill in art will understand that there are various ways to determine the rate in step 78 within the spirit and scope of this disclosure.

The method may continue with the step 80 of setting or retrieving a gears-remaining value. The gears-remaining value may be indicative of a number of gears below a current gear that are able to support a given speed of vehicle 10. The current gear may be an initial gear that vehicle 10 is in when tip-in mode was triggered at step 74 (or a previously set downshift gear, as explained below). In the illustrated example, the initial gear is tenth gear. With reference to FIG. 2, for a given speed of 2400 rpm, the number of gears below tenth gear that are able to support 2400 rpm are five (i.e., ninth, eighth, seventh, sixth, and fifth gears). At its highest point, downshift curve 42, which may represent a downshift from fifth gear to fourth gear does not equal or exceed 2400 rpm. As such, fourth gear and the gears below fourth gear are not able to support a speed of 2400 rpm in the illustrated embodiment. A gear may not be able to support a given speed if the given speed is at or above what is known in the art as a "lock-out speed" for that specific gear.

The method may continue with the step 81 of determining a last event line crossed. Although steps 78, 80, and 81 are illustrated as being performed in parallel, they may be performed sequentially in any order in accordance with other embodiments. If at step 76, multiple event lines 60, 62, 64, 66 were crossed, controller 14 determines which event line pedal 26 crossed last (within the predefined amount of time discussed above in connection with step 77). In one embodiment, the last event line crossed may be determined within the predefined amount of time upon the pedal crossing a first event line.

Figure 5A:
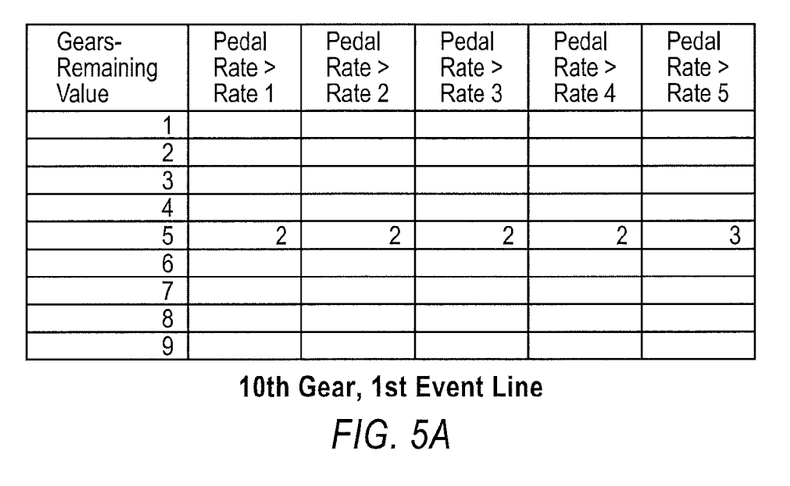
FIGS. 5A-5C illustrate the layout of look-up tables that may be used to determine downshift values in accordance with one embodiment of the algorithm illustrated in FIG. 4.
Figure 5B:
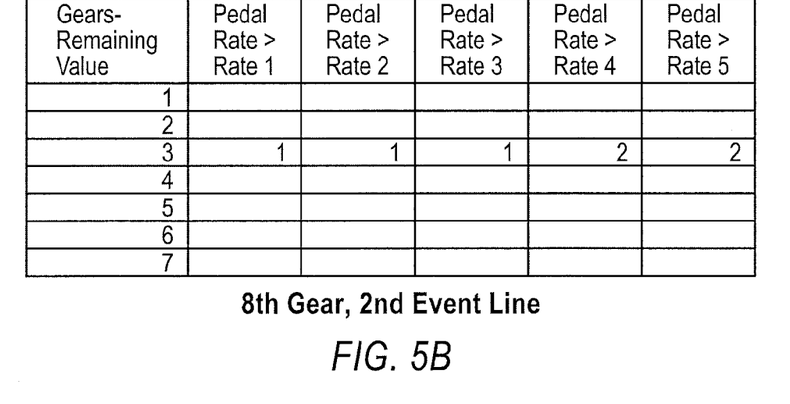
Figure 5C:
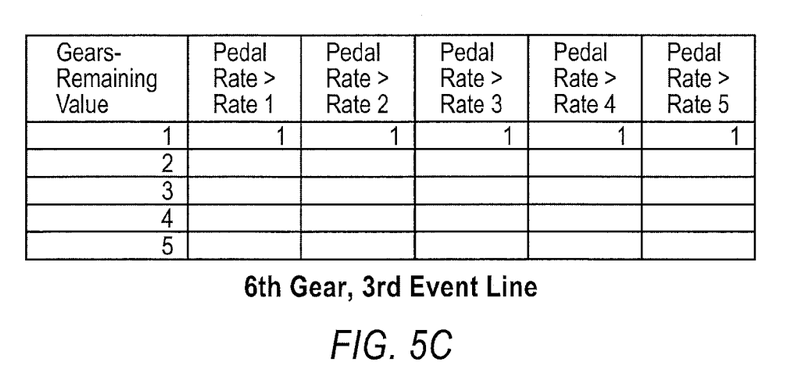

The method may continue with the step 82 of determining a downshift value. Reference will now be made to FIG. 5A. FIGS. 5A-5C illustrate the layout for look-up tables that may be used to determine downshift values in accordance with one embodiment of the algorithm illustrated in FIG. 4. In one embodiment, the downshift value may be predefined by the current gear, the rate of change of pedal position upon the pedal 26 crossing the event line(s) in step 76, and the gears-remaining value. In one embodiment, the downshift values may be found in look-up tables, and each gear may have a look-up table for each event line with each table giving a downshift value based on the gears-remaining value and the rate of change of pedal position. The look-up table of FIG. 5A may be applicable for tenth gear and the first event line, event line 60 (the last event line crossed within the predefined amount of time in the illustrated example). The applicable column may depend on where the rate of change of pedal position (pedal rate) falls with respect to Rates 1-5, which may be predefined. Rate 1 may be the smallest rate, and Rate 5 may be the highest rate. For example and without limitation, Rates 1-5 may be 10% per second, 25% per second, 50% per second, 80% per second, and 120% per second, respectively. In the illustrated example of FIGS. 5A-5C, only event line 60 was crossed at step 76, and the pedal rate (determined in step 78 of the current loop) is smaller than Rate 3 but greater than Rate 2. As such, the column "Pedal Rate>Rate 2" would be applicable. Therefore, for a gears-remaining value of "five" and a pedal rate exceeding Rate 2 but smaller than Rate 3, the downshift value may be equal to "two." One of ordinary skill in the art will understand that determination of the downshift value may be carried out in a number of different ways with or without the use of a look-up table. Moreover, less or more than five predefined rate thresholds (i.e., Rates 1-5) may be used. In some embodiments, the downshift value corresponding to Rate 1 may be less than the downshift value corresponding to Rate 5 for a given gears-remaining value, and the downshift value corresponding to a small gears-remaining value may be less than the downshift value corresponding to a greater gears-remaining value for a given pedal rate. In some embodiments, the downshift value may be in a range of zero to four, depending on the gears-remaining value and rate of change of pedal position.

The method may continue with the step 84 of setting a downshift gear. The downshift gear may be equal to the current gear less the downshift value determined in step 82. In one embodiment, controller 14 may be programmed to, responsive to the accelerator pedal 26 crossing each of the predefined positions (i.e., each of the event lines at a given speed), set the downshift gear. The downshift gear may be predefined by a rate of change of pedal position determined upon the crossing of the respective predefined position. In the illustrated example, for a current gear of "tenth gear" and the downshift value is set to "two," the downshift gear may be set to "eighth gear."

One of ordinary skill in the art will understand that step 82 may be omitted in some embodiments. In such embodiments, the look-up tables may instead be referred to in step 84 and include the actual downshift gear (to downshift to) rather than a downshift value to be subtracted from the current gear.

The method may continue with the step 85 of commanding a downshift according to the downshift gear set in step 84 of the current loop.

The method may continue with the step 86 of updating the gears-remaining value. At this point in the loop, because the downshift gear has been set to "eighth gear," the "current gear" may now be set to "eighth gear" (from tenth gear). As such, the gears-remaining value may be updated to determine whether controller 14 may re-enter the loop. Recall that in step 80 of the illustrated example, it was determined that "fifth gear" was the lowest gear able to support the given speed of 2400 rpm. For a current gear of "eighth gear" (i.e., downshift gear determined in step 84), the updated gears-remaining value may now be "three" (seventh, sixth, and fifth gears).

The method may continue with the step 88 of determining whether the updated gears-remaining value is greater than zero (i.e., there are more gears remaining to which controller 14 may command a downshift). If at step 88, controller 14 determines that the updated gears-remaining value is not greater than zero (i.e., there are no gears remaining that are able to support the given speed), the method may end, and controller 14 may exit tip-in mode.

If at step 88, controller 14 determines that the gears-remaining value is greater than zero (i.e., there are more gears remaining that are able to support the given speed), the method may continue with the step 92 of determining whether there are any event lines remaining (i.e., whether there are any predefined positions at the given speed greater than the predefined position exceeded in step 76). With reference to FIG. 3, in the illustrated example, because event line 60 was crossed in step 76, there are more event lines remaining (event lines 62, 64, 66). As such, the method may return to the step 76 of determining whether another event line(s) is crossed within the predefined amount of time discussed above.

In the illustrated example, because event line 60 was last crossed in step 76 of the previous loop, controller 14 will now be determining whether event lines 62, 64, and/or 66 have been crossed. Controller 14 may be programmed to wait a period of time to see whether an event line has been crossed. If controller 14 determines that an event line has not been crossed, controller 14 may exit tip-in mode and the tip-in event that began at step 74 may end. Exit from tip-in mode may be timer-based. For example and without limitation, if pedal 26 remains in the same position and an event line is not crossed within a certain period of time, controller 14 may exit tip-in mode. This period of time may vary depending on movement of the pedal. If driver backs out of the pedal, the period of time may be relatively small.

If controller 14 determines that another event line has been crossed, the method may continue with the step 77 of waiting the predefined amount of time to see if multiple event lines are crossed.

The method may continue with the steps 78, 80, 81 of determining the pedal rate, setting or retrieving the gears-remaining value, and determining the last event line crossed within the predefined amount of time, respectively (for a second loop in the illustrated example). The gears-remaining value at step 80 in the current loop may be the updated gears-remaining value determined in step 86 in the previous loop. As such, in the illustrated example, the gears-remaining value may be the retrieved value of "three."

The method may continue with the step 82 of determining the downshift value for the second loop. Reference will now be made to FIG. 5B. FIG. 5B illustrates the layout of a look-up table that may be used to determine the downshift value during the second loop in accordance with the algorithm illustrated in FIG. 4. In one embodiment, the downshift value after the first loop may also be predefined by the current gear (which may be the downshift gear determined in step 84 of the previous loop), the rate of change of pedal position, and the gears-remaining value determined in step 80. The look-up table of FIG. 5B may be applicable for eighth gear and the second event line, event line 62 (the last event line crossed within the predefined amount of time in the second loop of the illustrated example). In the illustrated embodiment, the predefined rate thresholds (Rates 1-5) are the same for each look-up table; however, in other embodiments, the predefined rate thresholds (Rates 1-5) may vary among the look-up tables. In the illustrated embodiment, the pedal rate (determined at step 78 of the current loop) is smaller than Rate 5 but greater than Rate 4. As such, the column "Pedal Rate>Rate 4" would be applicable. Therefore, for a gears-remaining value of "three" and a pedal rate exceeding Rate 4 but smaller than Rate 5, the downshift value may be equal to "two." As with the look-up table of FIG. 5A, in some embodiments, the downshift value corresponding to Rate 1 may be less than the downshift value corresponding to Rate 5 for a given gears-remaining value, and the downshift value corresponding to a small gears-remaining value may be less than the downshift value corresponding to a greater gears-remaining value for a given pedal rate. In some embodiments, the downshift value may be in a range of zero to four, depending on the gears-remaining value and rate of change of pedal position.

The method may continue with the step 84 of setting the downshift gear. Recall that in the illustrated example, the current gear is "eighth gear." In the second loop, the downshift gear may be the current gear ("eighth gear") less the downshift value set during the second loop at step 84 ("two"). As such, the downshift gear determined at step 84 in the second loop is "sixth gear" in the illustrated example.

The method may continue with the step 85 of commanding a downshift according to the downshift gear set in step 84 of the current loop.

The method may continue with the step 86 of updating the gears-remaining value, which may be indicative of the number of gears below the downshift gear ("sixth gear" in the illustrated example) that are able to support the given speed (2400 rpm in the illustrated example). Recall that in the illustrated example, "fifth gear" is the lowest gear that is able to support the given speed of 2400 rpm. As such, there is now only one gear remaining that is able to support the given speed in the illustrated example.

The method may continue with the step 88 of determining whether the updated gears-remaining value is greater than zero. In the illustrated example, because the updated gears-remaining value in the second loop is one, the method may continue with the step 92 of determining whether there are any event lines remaining (i.e., whether there are any predefined positions at the given speed greater than the last predefined position exceeded). With reference to FIG. 3, in the illustrated example, because event line 62 was crossed, there are more event lines remaining (event lines 64, 66). As such, the method may return to step 76 of determining whether another event line is crossed. Because event line 62 was last crossed, controller 14 will now be determining whether event lines 64, 66 are crossed. Controller 14 may be programmed to wait a period of time to see whether another event line is crossed.

If controller 14 determines that an event line has not been crossed, controller 14 may exit tip-in mode and the tip-in event that began at step 74 may end.

If controller 14 determines that another event line has been crossed, the method may continue with the step 77 of waiting the predefined amount of time to see if multiple event lines are crossed.

The method may continue with the steps 78, 80, 81 of determining the pedal rate, setting or retrieving the gears-remaining value, and determining the last event line crossed within the predefined amount of time, respectively (for a third loop in the illustrated example). The gears-remaining value at step 80 in the current loop may be the updated gears-remaining value determined in step 86 of the previous loop. As such, the gears-remaining value may be the retrieved value of "one."

The method may continue with the step 82 of determining the downshift value. Reference will now be made to FIG. 5C. FIG. 5C illustrates the layout of a look-up table that may be used to determine the downshift value during the third loop in accordance with the algorithm illustrated in FIG. 4. The look-up table of FIG. 5C may be similar to FIGS. 5A-5B. In one embodiment, the downshift value after the first loop may also be predefined by the current gear (which may be the downshift gear determined in step 84 of the previous loop), the rate of change of pedal position, and the gears-remaining value determined in step 80. The look-up table of FIG. 5C may be applicable for "sixth gear" and the third event line, event line 64 (the last event line crossed within the predefined amount of time in the third loop of the illustrated example). In the illustrated embodiment, the pedal rate (determined at step 78 of the current loop) is smaller than Rate 5 but greater than Rate 4. As such, the column "Pedal Rate>Rate 4" would be applicable. Therefore, for a gears-remaining value of "one" and a pedal rate exceeding Rate 4 but smaller than Rate 5, the downshift value may be equal to "one." As with the look-up tables of FIGS. 5A-5B, in some embodiments, the downshift value corresponding to Rate 1 may be less than the downshift value corresponding to Rate 5 for a given gears-remaining value, and the downshift value corresponding to a small gears-remaining value may be less than the downshift value corresponding to a greater gears-remaining value for a given pedal rate. In some embodiments, the downshift value may be in a range of zero to four, depending on the gears-remaining value and rate of change of pedal position.

The method may continue with the step 84 of setting the downshift gear. Recall that in the illustrated example, the current gear is "sixth gear." In the third loop, the downshift gear may be updated to be the current gear ("sixth gear") less the gears-remaining value set or retrieved during the third loop at step 80 ("one"). As such, the downshift gear determined at step 84 in the third loop is "fifth gear" in the illustrated example.

The method may continue with the step 85 of commanding a downshift according to the downshift gear set in step 84 of the current loop.

The method may continue with the step 86 of updating the gears-remaining value, which may be indicative of the number of gears below the current downshift gear ("fifth gear" in the illustrated example) that are able to support the given speed (2400 rpm in the illustrated example). Recall that in the illustrated example, "fifth gear" is the lowest gear that is able to support the given speed of 2400 rpm. As such, there are zero gears remaining that are able to support the given speed in the illustrated example.

The method may continue with the step 88 of determining whether the updated gears-remaining value is greater than zero. In the illustrated example, because the updated-gears remaining value in the third loop is "zero," the method may end, and controller 14 may exit tip-in mode. In the illustrated example of FIGS. 5A-5C, the crossing of event line 66 was irrelevant because there were no gears remaining after crossing of event line 64.

Figure 6:
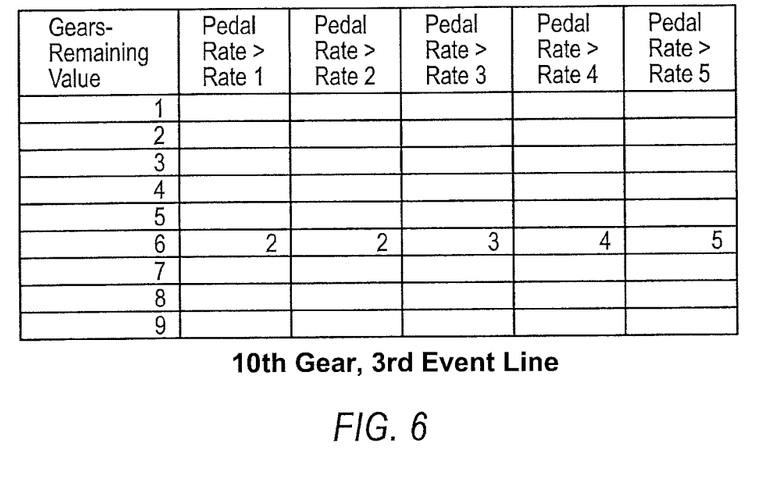
FIG. 6 illustrates a layout of a look-up table that may be used to determine a downshift value in accordance with another embodiment of the algorithm illustrated in FIG. 4.

FIG. 6 illustrates a layout of a look-up table that may be used to determine a downshift value in accordance with another embodiment of the algorithm illustrated in FIG. 4. In the illustrated example of FIGS. 5A-5C, controller 14 performed three downshifts (10-8, 8-6, 6-5). In the illustrated example of FIG. 6, controller 14 performs only one downshift, the initial gear being tenth gear and the given speed (at which the event line(s)/predefined position(s) is crossed) being 2000 rpm.

With reference to FIG. 4, at step 76 in the illustrated example (of FIG. 6), pedal 26 crosses three event lines 60, 62, 64 within the predefined amount of time (explained above in connection with step 77). As such, at step 81 controller 14 determines that the last event line crossed is event line 64. At step 82, the look-up table of FIG. 6 may be used to determine the downshift value. The look-up table of FIG. 6 may be applicable for "tenth gear" and event line 64 (the last event line crossed within the predefined amount of time). In the illustrated embodiment, the pedal rate (determined at step 78) is greater than Rate 5. As such, the column "Pedal Rate>Rate 5" would be applicable. Therefore, for a gears-remaining value of "six" (number of gears able to support the given speed of 2000 rpm, as illustrated in FIG. 2) and a pedal rate exceeding Rate 5, the downshift value may be equal to "five." Therefore, at step 84 controller 14 sets the downshift gear to fifth gear (from the initial gear of tenth gear), and at step 85 controller 14 commands the downshift accordingly. Although the pedal rate was high and there were six gears remaining in the illustrated example of FIG. 6, the controller commanded a downshift of only five gears. It may be desirable to program the controller in such a manner (leave more gear(s) available to downshift to) when there is another event line(s) remaining which the pedal may cross subsequently in the same tip-in event.

As shown in the illustrated examples, controller 14 may command a downshift to a downshift gear with a difference between the downshift gear and initial gear being greater than a number of event lines (or predefined positions) crossed by the pedal at a given speed when the gears-remaining value is greater than the number of event lines (predefined positions) crossed at a given speed.

Figure 7:
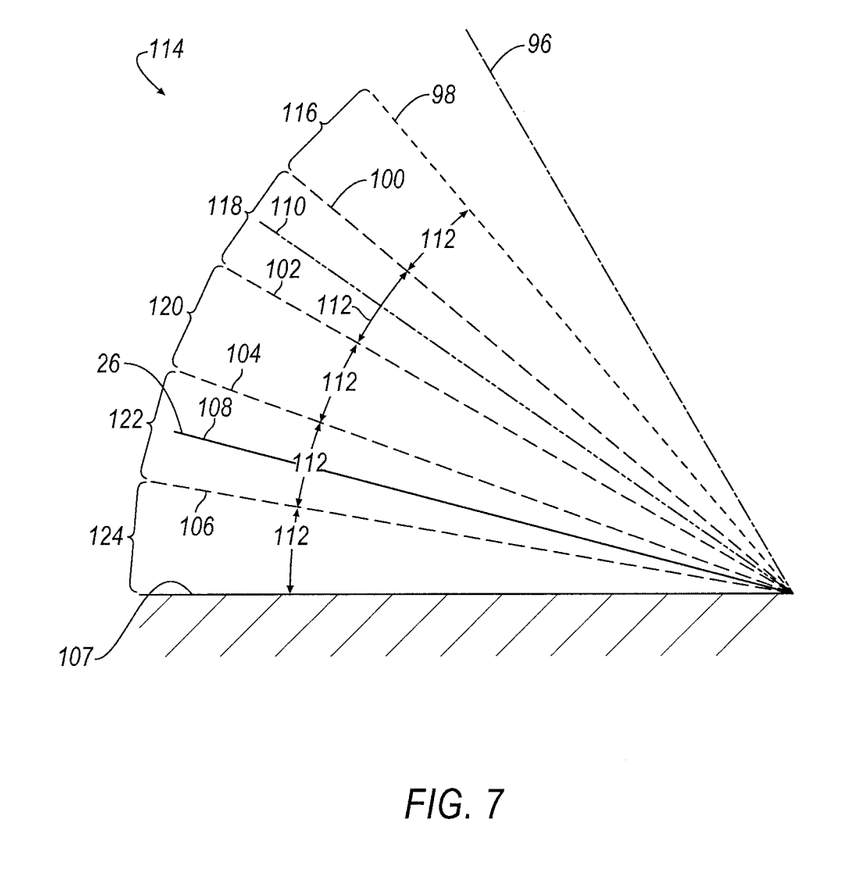
FIG. 7 is a schematic representation of accelerator pedal position with respect to the event lines of the downshift scheduling plot illustrated in FIG. 3.

FIG. 7 is a schematic representation of accelerator pedal position with respect to event lines of the downshift scheduling plot illustrated in FIG. 3 for a given speed. FIG. 7 visually illustrates crossing of the event lines 60, 62, 64, 66 at a given speed in accordance with one embodiment. A neutral position 96 may represent a position of the pedal 26 in an undepressed state (i.e., no pressure exerted on the pedal 26). A road-load position 98 may associate a pedal position for maintaining a speed of vehicle 10 (e.g., of output shaft 22), which may be 2400 rpm in the illustrated example. As illustrated, accelerator pedal 26 may be moveable across a plurality of predefined positions 100, 102, 104, 106, which may be associated with event lines 60, 62, 64, 66 (FIG. 3) at a given speed. In the illustrated example, the predefined positions 100, 102, 104, 106 may be representative of event lines 60, 62, 64, 66 at a given speed of 2400 rpm (note that the figures of the instant disclosure may not be drawn to scale). Predefined positions 100, 102, 104, 106 may be positioned differently relative to neutral position 96 and a WOT position 107 (fully depressed) for different speeds. In the illustrated embodiment, the pedal 26 may reach a tip-in position 108 at a given speed and, upon doing so, crosses predefined positions 100, 102, 104, 106. It should be noted, however, that tip-in mode may be triggered at any point relative to predefined positions 100, 102, 104, 106. For example and without limitation, tip-in mode may be triggered for a tip-in position denoted by line 110 (between predefined positions 100, 102). A tip-in position may be the final position the pedal 26 reaches from an initial position after crossing an event line(s) within the predefined amount of time (discussed above in connection with steps 76 and 77) to accelerate the vehicle 10. In the illustrated example of FIGS. 5A-5C, there were three tip-in positions within the same tip-in event. In the illustrated example of FIG. 6, there was one tip-in position.

In the illustrated example, the initial position may be the road-load position 98. However, in other embodiments, the initial position may be closer to the predefined positions 100, 102, 104, or 106. The predefined positions 100, 102, 104, 106 may be defined by a given speed of the vehicle 10 (e.g., of output shaft 22) upon reaching a tip-in position and by corresponding event lines 60, 62, 64, 66 associating vehicle speed with pedal position.

As described above in connection with the flowchart of FIG. 4, controller 14 may be programmed to, responsive to (1) the pedal 26 reaching a tip-in position 108 and (2) a gears-remaining value being greater than a number of predefined positions crossed or being greater than zero, command a downshift to a downshift gear from an initial gear. Furthermore, a difference between the initial and downshift gears may exceed a number of predefined positions the pedal 26 crosses upon moving to the tip-in position 108 when a rate of change of pedal position exceeds a predefined threshold. In one embodiment, a number of predefined positions is less than five, and the difference between the gears is greater than three. In addition and as discussed above, the gears-remaining value may be indicative of the number of gears below the initial gear (or current downshift gear set in the previous loop) that are able to support a given speed of the vehicle 10 upon reaching the tip-in position. As described above in connection with the illustrated example of FIG. 6, the initial gear was "tenth gear;" the pedal 26 crossed three predefined positions 100, 102, 104 upon moving to the tip-in position 108, and the rate of change of pedal position (i.e., referred to as "pedal rate" above) exceeded a predefined threshold such that the downshift gear was determined to be "fifth gear." As such, the difference between the initial gear ("tenth") and the downshift gear ("fifth") was "five," which exceeds "three" (the number of crossed predefined positions). The predefined threshold may vary depending on the initial gear and the initial position of pedal 26. The predefined threshold may be one of the Rates 1-5 described above.

Furthermore, as discussed above in connection with FIG. 4, the downshift gear may be the initial gear less the downshift value that is based on a last predefined position crossed upon reaching the tip-in position, the rate of change of pedal position, and the initial gear. The last predefined position crossed may be determined within a predefined amount of time upon the pedal crossing a first predefined position. The first predefined position may be the position at which tip-in mode was triggered.

As illustrated in FIG. 6, the plurality of predefined positions 100, 102, 104, 106 may be offset from adjacent predefined positions by a predefined offset 112 at a given speed. This predefined offset 112 may correspond to the offset between event lines 60, 62, 64, 66 shown in FIG. 3. Furthermore, predefined position 100 may be offset from road-load position 98 by the predefined offset 112, and predefined position 106 may be offset from WOT position 107 by the predefined offset 112. As shown, predefined position 100 may be adjacent road-load position 98 and predefined position 102; predefined position 102 may be adjacent predefined positions 100 and 104; predefined position 104 may be adjacent predefined positions 102, and 106; and predefined position 106 may be adjacent predefined position 104 and WOT position 107. Although the positioning of predefined positions 100, 102, 104, 106 may change depending on the speed of vehicle 10 (and the predefined offset 112 may therefore change), the predefined positions may be offset from one another by an equal amount (the predefined offset) in accordance with some embodiments. In one embodiment, the predefined offset 112 may be greater than 10% pedal adjusted at a given speed. In another embodiment, the predefined offset 112 may be within a range of 12-18% pedal adjusted. The predefined offset may be based on the specific vehicle and on a transfer function that maps customer foot rotation to percent pedal adjusted.

Still referring to FIG. 6, pedal 26 may be moveable within a pedal space 114 including a plurality of segments 116, 118, 120, 122, 124. Controller 14 may be programmed to, responsive to the pedal 26 moving from an initial segment to a tip-in position 108, command a downshift to a downshift gear from an initial gear. The plurality of segments 116, 118, 120, 122, 124 may be defined (at least in part) by the plurality of predefined positions 100, 102, 104, 106. The initial segment may be the segment of the plurality in which the initial position resides. In the illustrated embodiment, the initial position may be road-load position 98. As such, the initial segment is segment 116 in the illustrated example. In one embodiment, the difference between the initial gear and the downshift gear may exceed a number of segments the pedal 26 enters in the space 114 upon moving from the initial segment to the tip-in position 108 when a rate of change of pedal position ("pedal rate") exceeds a predefined threshold. In the illustrated example of FIG. 6, the difference between the initial gear ("tenth") and the downshift gear ("fifth") is "five," and the number of segments the pedal 26 enters upon moving from the initial segment (segment 116) to the tip-in position 108 is "three" (segments 118, 120, 122) when a rate of change of pedal position ("pedal rate") exceeds a predefined threshold. The predefined threshold may vary depending on the initial gear and the initial position of pedal 26. The predefined threshold may be one of the Rates 1-5 described above.

In one embodiment, controller 14 may be programmed to, responsive to accelerator pedal 26 crossing a predefined position 100 defining adjacent segments 116, 118 and reaching a tip-in position 110 in segment 118, command a downshift to a downshift gear from an initial gear, where a difference between the initial and downshift gears may be more than one when a rate of change of pedal position exceeds a predefined threshold. Segment 116 may further be defined by neutral position 96. Although adjacent segments 116, 118 were applicable for tip-in position 110, other adjacent segments may be applicable (and their shared predefined position) for a different tip-in position.

Figure 8:
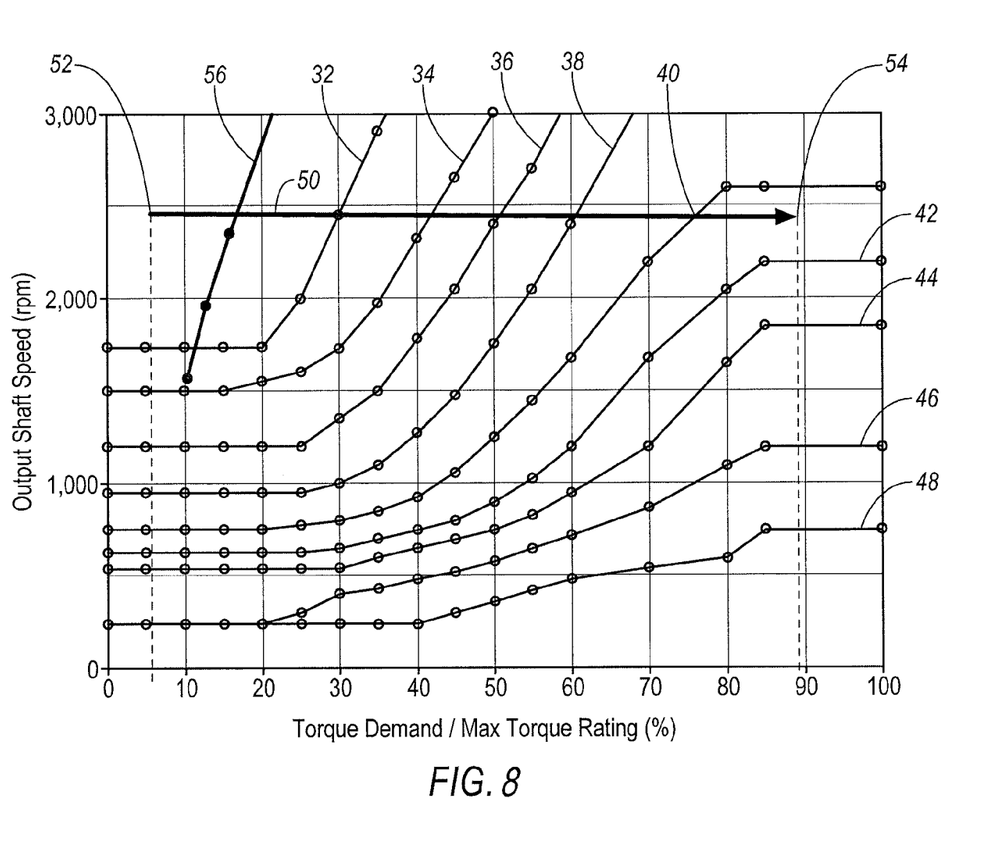
FIG. 8 is another downshift scheduling plot that may be implemented by a controller of an autonomous vehicle to control downshifts in accordance with another embodiment of the present disclosure.

FIG. 8 is another downshift scheduling plot that may be implemented by the controller 14 of vehicle 10 to control downshifts in accordance with another embodiment of the present disclosure. In some embodiments, vehicle 10 may be configured for autonomous driving operations. In such embodiments, the accelerator pedal 26 may or may not be present. Controller 14 may be programmed to observe torque demand rather than pedal position to determine downshifts.

As the vehicle accelerates, the torque demand increases and, correspondingly the "torque demand/max torque rating" percentage ("torque percentage") increases. As the torque percentage exceeds one or more than one predefined torque threshold(s) 32, 34, 36, 38, 40, 42, 44, 46, 48 at a given speed of output shaft 22 (shaft 22 shown in FIG. 1), the vehicle 10 may set and/or command a downshift to a downshift gear. The downshift scheduling plot of FIG. 8 is similar to the downshift scheduling plot of FIG. 2 except downshifting is based on the torque percentage and not on pedal position. Furthermore, elements and lines similar to those of the embodiment of FIG. 2 are shown by like reference numerals. The elements and lines denoted by the reference numerals in FIG. 8 are instead with respect to "torque percentage" and not "percent pedal adjusted" as in FIG. 2. In addition, rather than tip-in positions, in FIG. 8 reference numeral 52 may denote a starting torque percentage marking the beginning of a tip-in event, and reference numeral 54 may denote an ending torque percentage of the tip-in event.

Figure 9:
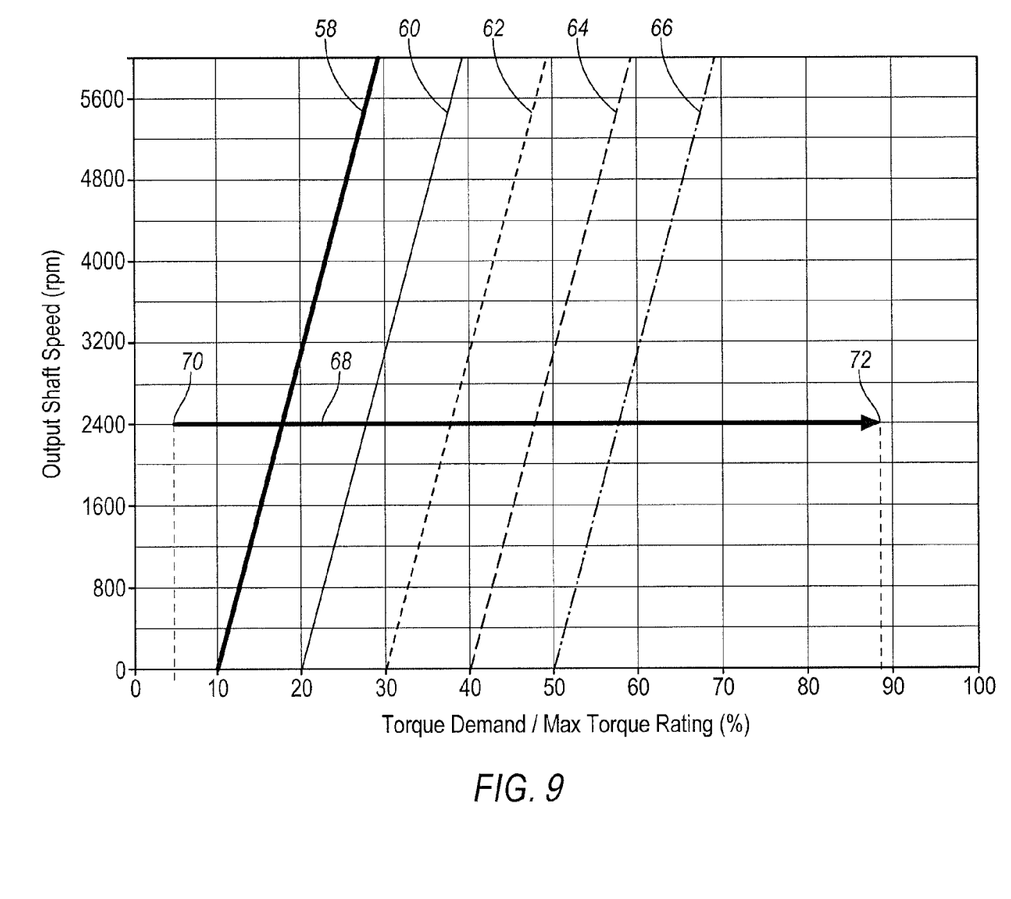
FIG. 9 is another downshift scheduling plot that may be implemented by the controller of the autonomous vehicle to control downshifts in accordance with another embodiment of the present disclosure.

FIG. 9 is another downshift scheduling plot that may be implemented by the controller 14 of vehicle 10 to control downshifts in accordance with another embodiment of the present disclosure. Similar to FIG. 8, the plot of FIG. 9 illustrates the predefined torque thresholds as event lines 60, 62, 64, 66 with each line representing a downshift by zero, one, or more than one gear. The downshift scheduling plot of FIG. 9 is similar to the downshift scheduling plot of FIG. 3 except downshifting is based on the torque percentage and not on pedal position. Furthermore, elements and lines similar to those of the embodiment of FIG. 3 are shown by like reference numerals. The elements and lines denoted by the reference numerals in FIG. 9 are instead with respect to "torque percentage" and not "percent pedal adjusted" as in FIG. 3. In addition, rather than tip-in positions, in FIG. 8 reference numeral 70 may denote a starting torque percentage marking the beginning of a tip-in event, and reference numeral 72 may denote an ending torque percentage of the tip-in event.

Figure 10:
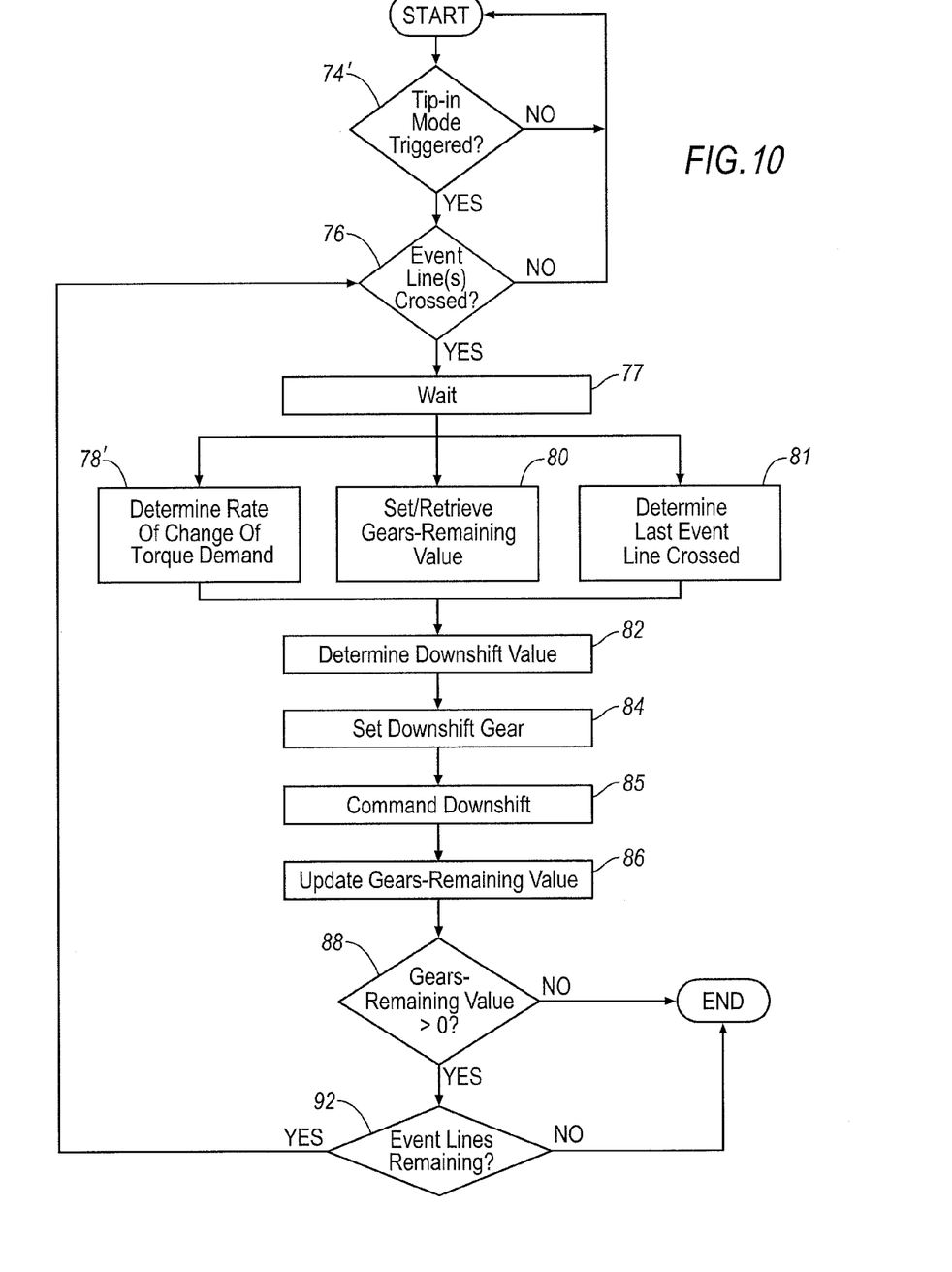
FIG. 10 illustrates a flowchart representing an algorithm in accordance with the downshift scheduling plot of FIG. 9.

FIG. 10 illustrates a flowchart representing an algorithm in accordance with the downshift scheduling plot of FIG. 9. The flowchart of FIG. 10 is similar to the flowchart of FIG. 4 except downshifting is based on torque percentage and not pedal position. Furthermore, the steps similar to those of the flowchart of FIG. 4 are shown by like reference numerals. The differences in the steps between the flowcharts will now be described.

The method of FIG. 10 may begin with the step 74' of determining whether tip-in mode is triggered. Tip-in mode may be associated with the tip-in downshift scheduling plot of FIG. 9. The algorithm illustrated in FIG. 10 may be used to determine a downshift gear to which controller 14 may command a downshift for increased acceleration. In one embodiment, controller 14 determines the desired increased acceleration.

In one embodiment, tip-in mode is triggered when (1) a rate of change of torque demand exceeds a calibratable rate threshold that is a function of the current gear and of the active shift schedule, (2) the torque demand is greater than a calibratable torque threshold that is a function of a speed of vehicle 10 (e.g., of output shaft 22) and of the active shift schedule, and (3) there is at least one downshift gear available (i.e., current gear is above first gear and there is a lower gear available that can support the current speed). In the illustrated embodiment, the torque demand is the torque percentage described hereinabove. However, one of ordinary skill in the art will understand that other values besides the "torque percentage" may be utilized with the embodiments disclosed herein. With respect to (2), the calibratable torque threshold for triggering tip-in mode may be the predefined torque threshold associated with the first event line (event line 60 in the illustrated example) for a given speed. If at step 74', tip-in mode is not triggered, controller 14 may continue to operate under the active shift schedule until conditions associated with a different shift schedule are met.

If at step 74', tip-in mode is triggered, the method may continue with the step 76 of determining whether an event line 60, 62, 64, 66 has been crossed, as described hereinabove in connection with FIG. 4.

If at step 76, controller 14 determines that an event line has been crossed, the method may continue with the step 77 of waiting a predefined amount of time to determine whether the torque demand increases through additional event lines 60, 62, 64, and/or 66 (i.e., additional predefined torque thresholds at the given speed). In one embodiment, the predefined amount of time may be 30-100 milliseconds. For a quickly increasing torque demand, the torque demand may increase through multiple event lines within the predefined amount of time.

After expiration of the predefined amount of time, the method may continue with the step 78' of determining a rate of change of torque demand. The rate may be continuously calculated and filtered with a simple time constant. For example and without limitation, the rate may be calculated using a double rolling average calculation where a filter constant (e.g., a percentage) is applied to the change of torque demand (from previous loop to current loop) and added to the previously calculated rate. Those of ordinary skill in art will understand that there are various ways to determine the rate in step 78' within the spirit and scope of this disclosure.

With respect to step 82, determining the downshift value may be performed in the same manner as described hereinabove. For example and without limitation, controller 14 may retrieve a downshift value from the appropriate lookup table based on the gears-remaining value and rate of change of torque demand (and where the rate falls relative to predefined rate thresholds).

Similar to the algorithm illustrated in FIG. 4, controller 14 may be programmed to responsive to a computed torque demand increasing through at least one predefined torque threshold in a plurality of predefined torque thresholds and a rate of change of the torque demand exceeding a predefined rate threshold, command a downshift to a downshift gear from an initial gear upon expiration of a predetermined amount of time, wherein the downshift gear may be based on a highest of the torque thresholds through which the demand increased, and wherein a difference between the gears exceeds a number of predefined torque thresholds crossed. The computed torque demand may be the "torque percentage" described hereinabove in accordance with one embodiment. The predefined rate threshold may vary depending on the initial gear and the starting torque demand. In one embodiment, the predefined rate threshold may be one of the Rates 1-5 described above in connection with FIGS. 5A-5C and 6.

Furthermore, the difference between the downshift and initial gears may exceed a number of predefined torque thresholds through which the computed torque demand increased within the predefined amount of time when a gears-remaining value is greater than the number of predefined torque thresholds through which the demand increased, and wherein the gears-remaining value is indicative of a number of gears below the initial gear that are able to support a given speed of the vehicle upon increasing through the at least one predefined torque threshold. The computed torque demand may be the "torque percentage" described hereinabove in accordance with one embodiment.

It should be understood that the flowcharts in FIG. 4 and FIG. 10 are for illustrative purposes only and that the methods should not be construed as limited to the flowcharts in the figures. Some of the steps of the methods may be rearranged while others may be omitted entirely.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle comprising:
   an accelerator pedal moveable across a plurality of predefined positions; and
   a controller programmed to, responsive to the pedal reaching a tip-in position, command a downshift to a downshift gear from an initial gear,
   wherein a difference between the initial and downshift gears exceeds a number of predefined positions crossed upon moving to the tip-in position when a rate of change of pedal position exceeds a predefined threshold.

2. The vehicle of claim 1, wherein the predefined positions are defined by corresponding event lines at a given speed of the vehicle upon reaching the tip-in position.

3. The vehicle of claim 1, wherein a number of predefined positions in the plurality is less than five, and the difference between the initial and downshift gears is greater than three.

4. The vehicle of claim 1, wherein the predefined positions are offset from adjacent predefined positions by a predefined offset greater than ten percent pedal adjusted.

5. The vehicle of claim 1, wherein the difference between the downshift and initial gears exceeds the number of predefined positions crossed upon moving to the tip-in position when a gears-remaining value is greater than the number of predefined positions crossed, and wherein the gears-remaining value is indicative of a number of gears below the initial gear that are able to support a given speed of the vehicle upon reaching the tip-in position.

6. The vehicle of claim 1, wherein the downshift gear is the initial gear less a downshift value that is based on a last predefined position crossed upon reaching the tip-in position, the rate of change of pedal position, and the initial gear.

7. The vehicle of claim 1, wherein the last predefined position crossed is determined within a predefined amount of time upon the pedal crossing a first predefined position.

8. A vehicle comprising:
   an accelerator pedal moveable across a plurality of predefined positions; and
   a controller programmed to,
     responsive to the pedal crossing at least one position, set a downshift gear based on a last position crossed, and
     responsive to the pedal reaching a tip-in position, command a downshift to the downshift gear from an initial gear,
   wherein a difference between the gears exceeds a number of predefined positions crossed upon reaching the tip-in position.

9. The vehicle of claim 8, wherein the downshift gear is predefined by a rate of change of pedal position.

10. The vehicle of claim 8, wherein the predefined positions are defined by corresponding event lines at a given speed of the vehicle upon reaching the tip-in position.

11. The vehicle of claim 8, wherein the last position crossed is determined within a predefined amount of time upon the pedal crossing a first predefined position.

12. The vehicle of claim 8, wherein the predefined positions of the plurality are offset from adjacent predefined positions by a predefined offset greater than ten percent pedal adjusted.

13. The vehicle of claim 8, wherein the difference between the downshift and initial gears exceeds the number of predefined positions crossed upon moving to the tip-in position when a gears-remaining value is greater than the number of predefined positions crossed, and where the gears-remaining value is indicative of a number of gears below the initial gear that are able to support a given speed of the vehicle upon reaching the tip-in position.

14. The vehicle of claim 8, wherein the downshift gear is the initial gear less a downshift value that is based on the last position crossed, a rate of change of pedal position, and the initial gear.

15. A vehicle comprising:
an accelerator pedal moveable across a plurality of predefined positions; and
a controller programmed to,
responsive to the pedal crossing at least one predefined position at a given speed upon reaching a tip-in position, command a downshift to a downshift gear from an initial gear,
wherein the downshift gear is based on a rate of change of pedal position, a last predefined position crossed upon reaching the tip-in position, and a gears-remaining value indicative of a number of gears able to support the given speed, and wherein a difference between the downshift and initial gears is greater than a number of predefined positions crossed upon reaching the tip-in position.

16. The vehicle of claim 15, wherein the predefined positions are defined by corresponding event lines at a given speed of the vehicle upon reaching the tip-in position.

17. The vehicle of claim 15, wherein the predefined positions of the plurality are offset from adjacent predefined positions by a predefined offset greater than ten percent pedal adjusted.

18. The vehicle of claim 15, wherein the difference between the downshift and initial gears exceeds the number of predefined positions crossed upon moving to the tip-in position when the gears-remaining value is greater than the number of predefined positions crossed.

19. The vehicle of claim 15, wherein the last predefined position crossed is determined within a predefined amount of time upon the pedal crossing a first predefined position.

20. The vehicle of claim 15, wherein a number of predefined positions in the plurality is less than five, and the difference between the initial and downshift gears is greater than three.

21. A method for downshifting a transmission, comprising:
responsive to a computed torque demand increasing through at least one predefined torque threshold in a plurality of predefined torque thresholds and a rate of change of the torque demand exceeding a predefined rate threshold, command a downshift to a downshift gear from an initial gear upon expiration of a predefined amount of time,
wherein the downshift gear is based on a highest of the torque thresholds through which the demand increased within the predefined amount of time, and a difference between the gears exceeds a number of predefined torque thresholds crossed.

22. The method of claim 21, wherein the difference between the downshift and initial gears exceeds a number of predefined torque thresholds through which the computed torque demand increased within the predefined amount of time when a gears-remaining value is greater than the number of predefined torque thresholds through which the demand increased, and wherein the gears-remaining value is indicative of a number of gears below the initial gear that are able to support a given speed of the vehicle upon increasing through the at least one predefined torque threshold.

* * * * *